No. 877,018. PATENTED JAN. 21, 1908.
J. H. TRACY.
OPERATION OF STORAGE BATTERIES IN CONNECTION WITH ALTERNATING CURRENT SYSTEMS.
APPLICATION FILED JUNE 21, 1907.

2 SHEETS—SHEET 2.

Witnesses

Inventor
Joseph H. Tracy.
By
Augustus B. Stoughton.
Attorney

UNITED STATES PATENT OFFICE.

JOSEPH H. TRACY, OF PHILADELPHIA, PENNSYLVANIA.

OPERATION OF STORAGE-BATTERIES IN CONNECTION WITH ALTERNATING-CURRENT SYSTEMS.

No. 877,018.

Specification of Letters Patent.

Patented Jan. 21, 1908.

Application filed June 21, 1907. Serial No. 380,005.

*To all whom it may concern:*

Be it known that I, JOSEPH H. TRACY, a citizen of the United States, and resident of Philadelphia, in the county of Philadelphia and State of Pennsylvania, have invented certain new and useful Improvements in the Operation of Storage Batteries in Connection with Alternating-Current Systems, of which the following is a specification.

When operating a storage battery in connection with an alternating current system through a rotary and booster the regulation is not always satisfactory by reason of faulty location and excitation of the field of the rotary.

The object of the present invention is to obviate such defects and disadvantages and to provide for the proper excitation of the field of the rotary.

Figure 1:
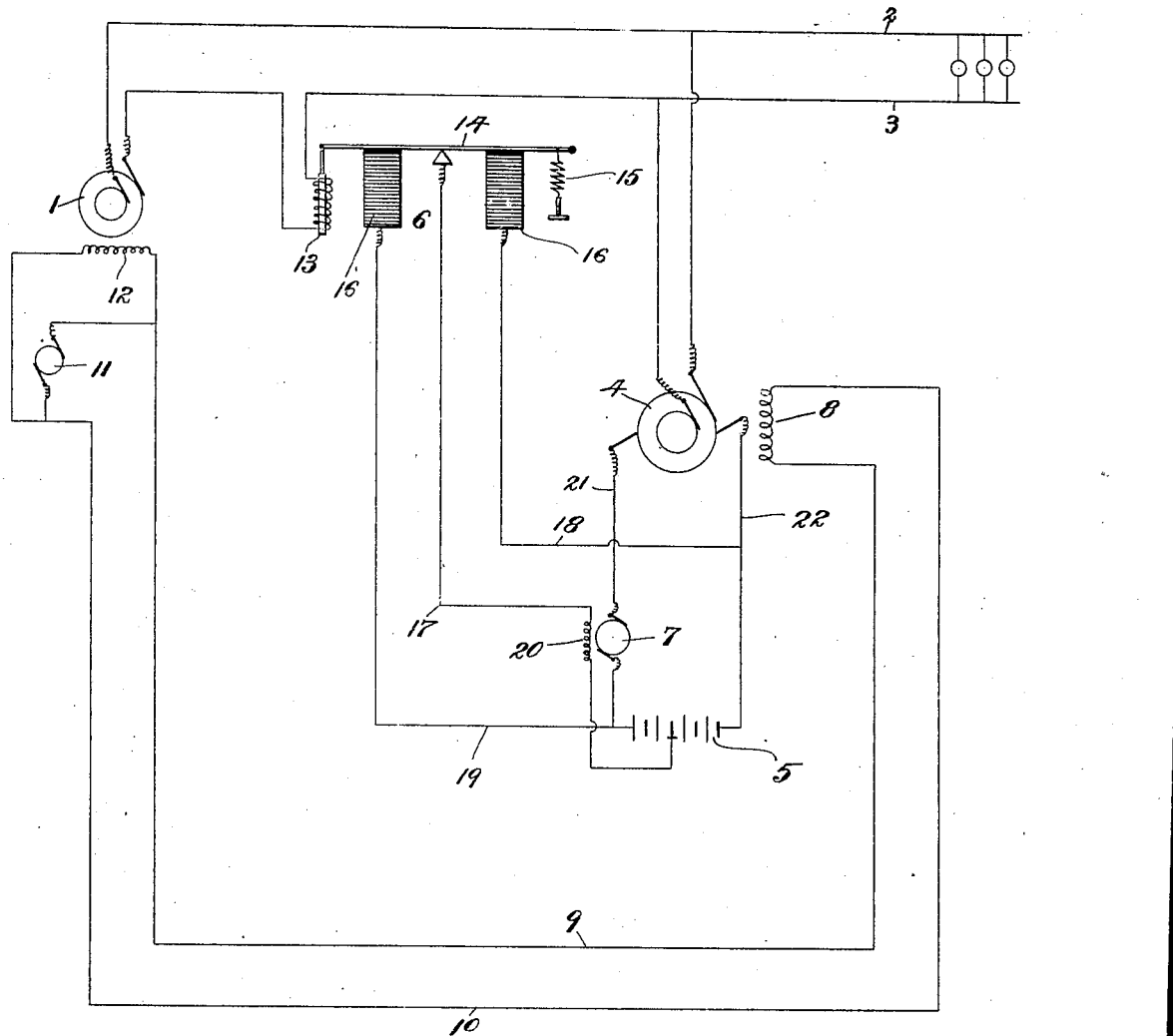
Figure 2:
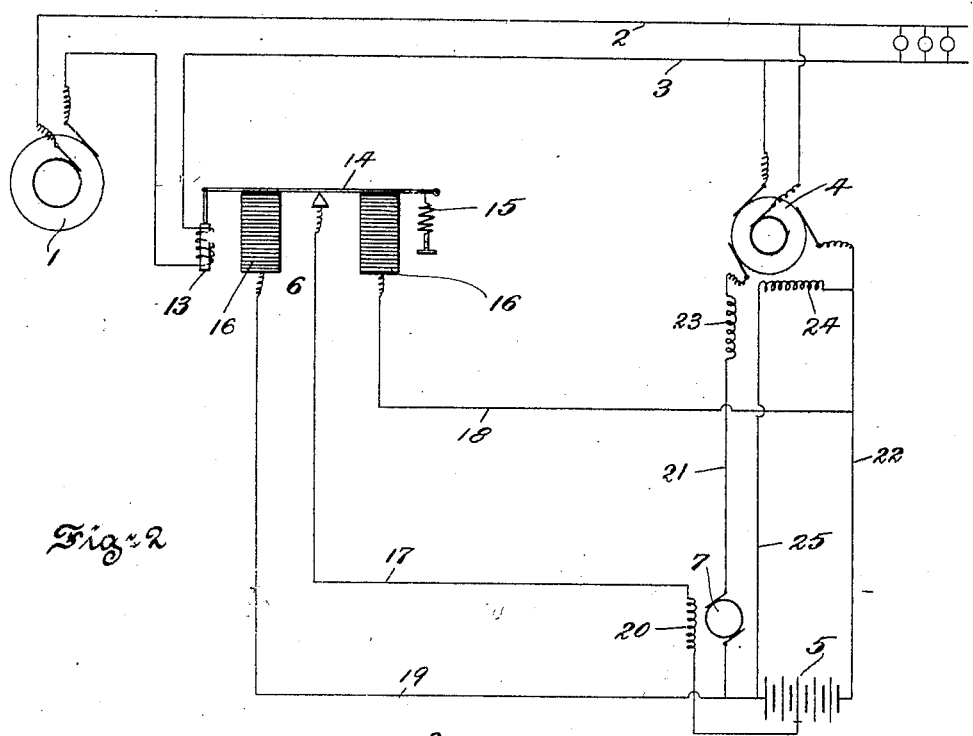
Figure 3:
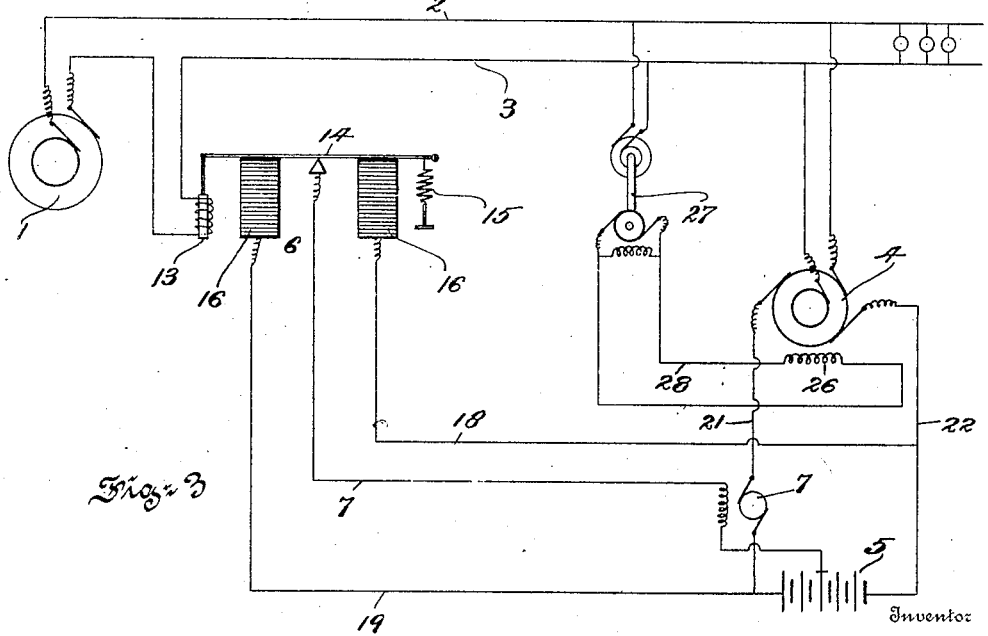

In the accompanying drawings, Figure 1, is a diagrammatic view of a circuit embodying features of the invention, and Figs. 2, and 3, are similar views illustrating modifications.

In the drawings 1, is an alternating current generator having a work circuit 2—3.

4, is a rotary converter.

5, is a storage battery and 6, is a regulator of the type described in Letters Patent No. 657,722.

7, is a properly driven booster for the storage battery.

Referring to Fig. 1, the field 8 for the rotary is included in a circuit 9—10, excited by means of an exciter 11, which also excites the field 12 of the generator 1. The fluctuations in the alternating current line influences the core 13 connected with the pivotal arm 14, having a spring 15, and adapted to press upon one or the other of a pile of carbon 16. The middle of the battery is connected by a conductor 17, to one end of both piles of carbons and the other ends of the piles of carbon are connected by means of conductors 18 and 19, across the battery 5. The field 20, of the booster is interposed in the conductor 17 and as the arm 14, under the influence of fluctations, presses upon one or the other of the piles of carbon, current in proper amount and direction is sent through the field 20, so as to cause the booster to make the battery charge or discharge, as may be required for effecting regulation. The battery is connected by means of conductors 21 and 22, with the direct current end of the rotary 4. Hitherto rotaries had their field excitation arranged across the conductors 21 and 22, and the result of locating the field at this position is that when a heavy load comes on the alternating current system it operates the regulator and helps the booster to build up; the effect of this is that the voltage at the field when so located is raised and the field of the rotary is increased to such an extent that advance currents are impressed upon the line, which react upon the generator affecting its armature re-action in such a way as to make its voltage higher. The result of a higher voltage of the generator is to prevent the battery from taking the desired portion of the change in load in the circuit 2, 3. However, in the described arrangement shown on the drawings, the field 8, is excited in such a way that its strength will not be influenced by the change in the voltage of the booster.

Referring to Fig. 2, the construction and operation is as has been described in connection with Fig. 1, except that the field for the rotary 4, is a compound field; one coil 23 is placed in the conductor 21 and the other coil 24, is placed in the conductor 25 across the battery, thus this compound field is not influenced by the change in voltage of the booster.

Referring to Fig. 3, the construction and arrangement is as has been described with the exception the field 26 for the rotary is independently excited from a motor driven exciter 27; one end of which is connected across the line 2—3 and the other end of which is provided with a circuit 28, containing the field 26.

What I claim is,

1. The combination of an alternating current generator and its circuit, a storage battery and its booster and direct current circuit, a rotary converter interposed between the direct current circuit and the alternating current circuit, means responsive to fluctuations in the alternating current circuit and adapted to change the voltage of the booster, and a field for the rotary converter the strength of which is independent of the direct current voltage of the rotary, substantially as described.

2. An alternating current generator and its circuit, a storage battery and its complemental booster and circuit, transforming provisions interposed between the alternating current circuit and the battery circuit, means responsive to fluctuations in the alternating current circuit for varying the voltage of the booster, and a field for the transforming provisions the strength of which is independent of the voltage of the booster, substantially as described.

In testimony whereof I have hereunto signed my name.

JOSEPH H. TRACY.

Witnesses:
BRUCE FORD,
GEO. M. HOWARD.